US010683903B2

(12) United States Patent
Hill

(10) Patent No.: US 10,683,903 B2
(45) Date of Patent: Jun. 16, 2020

(54) INTEGRAL TORQUE LIMITER DIFFERENTIAL

(71) Applicant: HAMILTON SUNDSTRAND CORPORATION, Charlotte, NC (US)

(72) Inventor: David G. Hill, Rockford, IL (US)

(73) Assignee: HAMILTON SUNSTRAND CORPORATION, Charlotte, NC (US)

( * ) Notice: Subject to any disclaimer, the term of this patent is extended or adjusted under 35 U.S.C. 154(b) by 61 days.

(21) Appl. No.: 15/941,538

(22) Filed: Mar. 30, 2018

(65) Prior Publication Data
US 2019/0301547 A1 Oct. 3, 2019

(51) Int. Cl.
*F16D 59/00* (2006.01)
*F16H 48/08* (2006.01)
*F16H 48/42* (2012.01)
*F16D 55/36* (2006.01)
*F16D 125/58* (2012.01)
*F16H 57/00* (2012.01)
*F16D 127/00* (2012.01)

(52) U.S. Cl.
CPC ............. *F16D 59/00* (2013.01); *F16D 55/36* (2013.01); *F16H 48/08* (2013.01); *F16H 48/42* (2013.01); *F16D 2125/582* (2013.01); *F16D 2127/005* (2013.01); *F16H 57/0025* (2013.01)

(58) Field of Classification Search
CPC .... F16D 59/00; F16D 55/36; F16D 2125/582; F16D 2127/005; F16H 48/08; F16H 48/42; F16H 57/0025
USPC .......................................................... 475/22
See application file for complete search history.

(56) References Cited

U.S. PATENT DOCUMENTS

| 2,966,076 | A | * | 12/1960 | 'Brien | F16H 48/22 475/234 |
| 3,815,442 | A | * | 6/1974 | McAninch | F16H 48/08 475/235 |
| 4,445,400 | A | * | 5/1984 | Sullivan | F16H 48/08 192/52.5 |
| 6,692,399 | B2 | | 2/2004 | Larson et al. | |
| 6,810,656 | B2 | | 11/2004 | Kortum et al. | |
| 6,834,758 | B2 | | 12/2004 | Nguyen et al. | |
| 7,708,665 | B2 | | 5/2010 | Wheals | |

(Continued)

FOREIGN PATENT DOCUMENTS

| EP | 1342603 A2 | 9/2003 |
| EP | 2054299 B1 | 5/2009 |
| EP | 2347109 B1 | 7/2011 |

OTHER PUBLICATIONS

European Search Report for Application No. 19164234.7, dated Dec. 2, 2019, 9 pages.

*Primary Examiner* — Leslie A Nicholson, III
(74) *Attorney, Agent, or Firm* — Cantor Colburn LLP

(57) ABSTRACT

A differential assembly provided with a power distribution unit includes a first housing, an output shaft, a shaft, and a torque limiter. The first housing defines a biasing member bore and a brake bore. The output shaft extends at least partially through the first housing. The shaft is disposed about the output shaft and extends between a first shaft end that is connected to a differential unit and a second shaft end. The torque limiter is disposed within the first housing and is arranged to selectively inhibit rotation of at least one of the output shaft and the shaft.

9 Claims, 5 Drawing Sheets

(56) References Cited

U.S. PATENT DOCUMENTS

| | | | |
|---|---|---|---|
| 8,506,439 B2* | 8/2013 | Strasser | B60K 6/387 |
| | | | 475/221 |
| 9,434,469 B2 | 9/2016 | Zantz et al. | |
| 9,657,827 B2 | 5/2017 | Gopal et al. | |
| 10,012,299 B2* | 7/2018 | Cooper | F16H 48/22 |
| 10,132,394 B2* | 11/2018 | Genise | B60K 17/08 |
| 10,267,401 B2* | 4/2019 | Valente | F16D 25/082 |
| 2008/0283344 A1* | 11/2008 | Inoue | F16D 55/36 |
| | | | 188/71.5 |
| 2010/0285917 A1* | 11/2010 | Rahm | F16H 48/08 |
| | | | 475/220 |
| 2015/0107933 A1 | 4/2015 | Gopal et al. | |
| 2015/0369319 A1 | 12/2015 | Davies | |

* cited by examiner

10,683,903 B2

INTEGRAL TORQUE LIMITER DIFFERENTIAL

BACKGROUND

Exemplary embodiments pertain to the art of differentials having torque limiters.

A power drive unit includes gear trains possibly having a differential. The power drive unit provides a mechanical output to an output member, such as an aircraft control surface or other device requiring rotary power input from a power source. The differential may be provided with a torque limiter that is arranged to limit an output torque to inhibit or reduce the transmission of torque by the output member.

BRIEF DESCRIPTION

Disclosed is a differential assembly that includes a housing assembly, an output shaft, a shaft, a differential unit, and a torque limiter. The housing assembly is disposed about a first axis and has a first housing and a second housing. The first housing and the second housing defining a cavity therebetween. The output shaft extends at least partially through at least one of the first housing and the second housing along the first axis. The shaft is disposed about and is arranged to translate along the first axis relative to the output shaft. The differential unit is disposed within the cavity and is connected to at least one of the output shaft and the shaft. The torque limiter is disposed about the output shaft and a portion of the shaft. The torque limiter is arranged to selectively engage a stop wall of at least one of the first housing and the second housing to inhibit rotation of the output shaft about the first axis.

Also disclosed is a differential assembly provided with a power distribution unit. The differential assembly includes a first housing, an output shaft, a shaft, and a torque limiter. The first housing defines a biasing member bore and a brake bore. The output shaft extends at least partially through the first housing. The shaft is disposed about the output shaft and extends between a first shaft end that is connected to a differential unit and a second shaft end. The torque limiter is disposed within the first housing and is arranged to selectively inhibit rotation of at least one of the output shaft and the shaft.

BRIEF DESCRIPTION OF THE DRAWINGS

The following descriptions should not be considered limiting in any way. With reference to the accompanying drawings, like elements are numbered alike.

DETAILED DESCRIPTION

Figure 1:
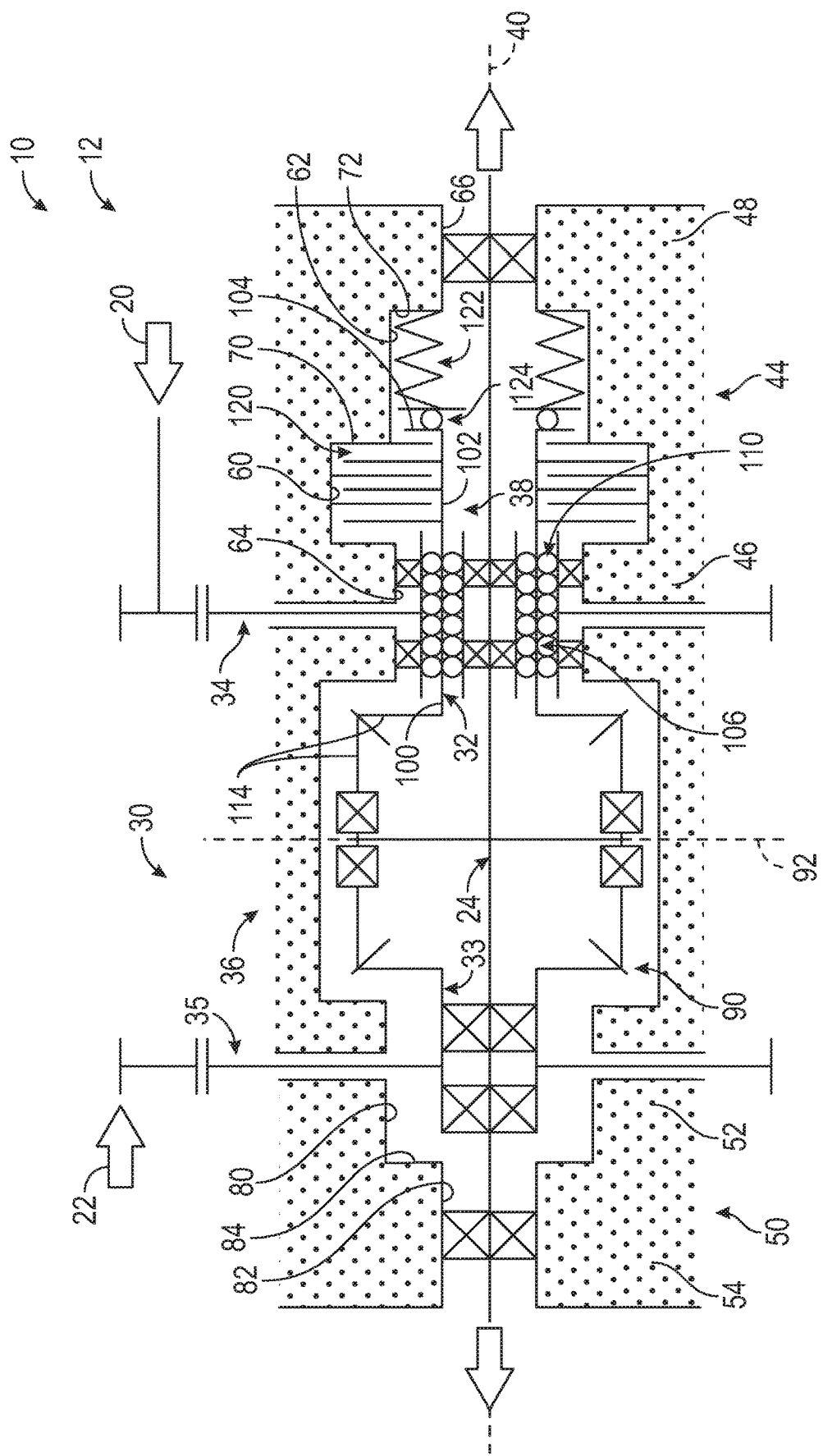
FIG. 1 is a schematic illustration of a first embodiment of a differential assembly having a single brake in a first position.

A detailed description of one or more embodiments of the disclosed apparatus and method are presented herein by way of exemplification and not limitation with reference to the Figures.

Referring to the Figures, a power drive unit 10 includes a gear train having a differential assembly 12. The power drive unit 10 may receive power inputs from a first power input 20 and a second power input 22, such as motors that are combined or run individually through the differential assembly 12 and delivered to an output device, control device, reduction gear assembly or gear, or the like through an output shaft 24. The first power input 20 and the second power input 22 are independent/redundant power inputs, where one is sufficient for functionality. The output shaft 24 may be an output shaft assembly having a first output shaft and a second output shaft that are coupled to each other through a differential unit.

Figure 3:
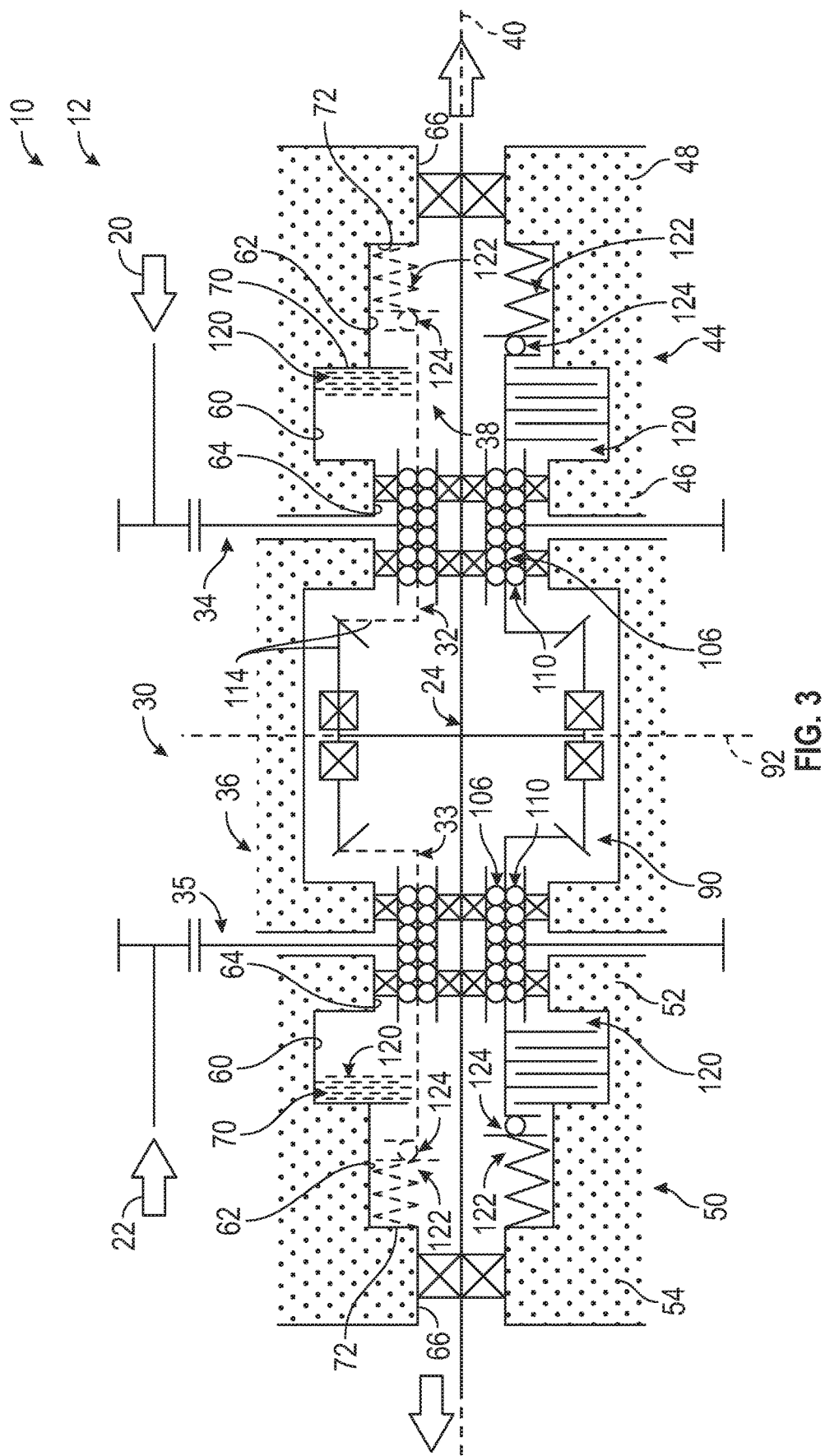
FIG. 3 is a schematic illustration of a split view of the second embodiment of the differential assembly in a second position.
Figure 4:
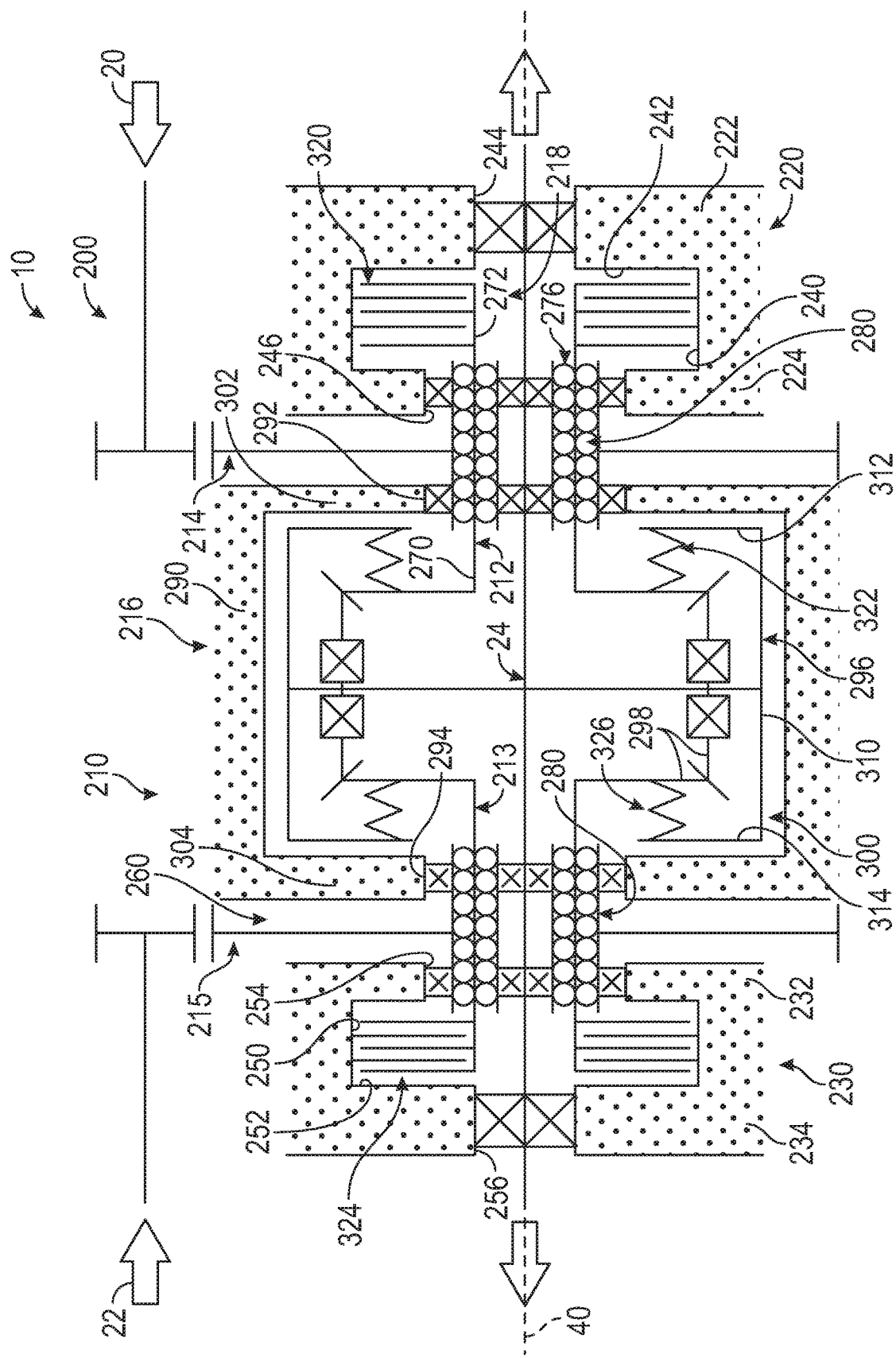
FIG. 4 is a schematic illustration of a third embodiment of a differential assembly having a carrier spring in a first position.

The differential assembly 12 includes the output shaft 24, a housing assembly 30, a first carrier or a first shaft 32, a first input member 34, a second input member 35, a differential unit 36, and a torque limiter 38. The differential assembly 12 may be arranged to include a single brake torque limiter, as shown in FIG. 1, or a dual brake torque limiter, as shown in FIGS. 2, 3, and 4.

Figure 2:
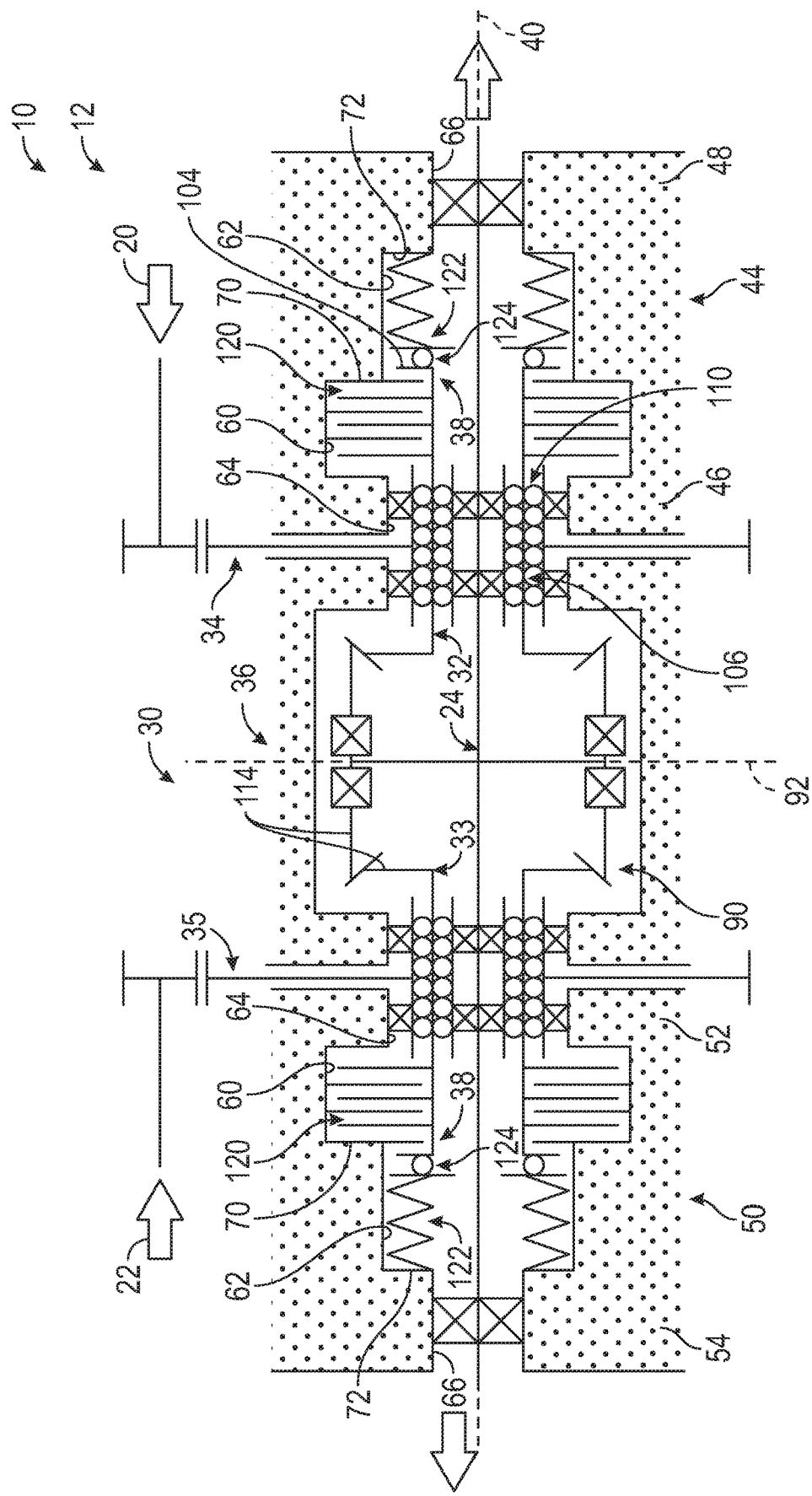
FIG. 2 is a schematic illustration of a second embodiment of a differential assembly having dual brakes in a first position.

Referring to FIGS. 1 and 2, the housing assembly 30 is disposed about a first axis 40. The housing assembly 30 includes a first housing 44 that extends between a first housing first end portion 46 and a first housing second end portion 48 along the first axis 40. The housing assembly 30 further includes a second housing 50 that extends between a second housing first end portion 52 and a second housing second end portion 54 along the first axis 40.

The first housing 44 defines a brake bore 60, a biasing member bore 62, a first bearing bore 64, and a second bearing bore 66.

The brake bore 60 extends from the first housing first end portion 46 towards a stop wall 70. The stop wall 70 is disposed between the brake bore 60 and the biasing member bore 62. In at least one embodiment, the stop wall 70 may be defined by a portion of the first housing first end portion 46 that extends between the first bearing bore 64 and the brake bore 60. The brake bore 60 may have a brake bore diameter.

The biasing member bore 62 extends from the stop wall 70 towards an end wall 72 defined by the first housing second end portion 48. In the embodiment shown, the biasing member bore 62 may have a biasing member bore diameter that is less than the brake bore diameter. In other embodiments, the biasing member bore 62 may have a biasing member bore diameter that is greater than or substantially equal to the brake bore diameter.

The first bearing bore 64 may be defined by the first housing first end portion 46. The first bearing bore 64 is arranged such that the brake bore 60 is disposed between the first bearing bore 64 and the biasing member bore 62. The first bearing bore 64 may have a first bearing bore diameter.

The second bearing bore 66 may be defined by the first housing second end portion 48. The second bearing bore 66 is arranged such that the biasing member bore 62 is disposed between the brake bore 60 and the second bearing bore 66. In the embodiment shown, the second bearing bore 66 may have a second bearing bore diameter that is less than the first bearing bore diameter. In other embodiments, the second bearing bore 66 may have a second bearing bore diameter that is greater than or substantially equal to the first bearing bore diameter.

The second housing 50 is spaced apart from the first housing 44. The second housing 50 defines a first bore 80 and a second bore 82. The first bore 80 extends from the second housing first end portion 52 towards the second housing second end portion 54. The first bore 80 may have a first bore diameter. The second bore 82 extends towards the second housing second end portion 54. In the embodiment shown, the second bore 82 may have a second bore diameter that is less than the first bore diameter. In other embodiments, the second bore 82 may have a second bore diameter that is greater than or substantially equal to the first bore diameter.

In the embodiment shown in FIGS. 2 and 3, the second housing 50 may have a substantially similar configuration as the first housing 44. In such an arrangement, the features of the second housing 50 may be similar features as to the first housing 44 but mirrored about an axis of symmetry that is disposed transverse to the first axis 40 and extends through a center of the differential unit 36. In this arrangement, the first bore 60 may be a brake bore, the second bore 62 may be a biasing member bore, and the end wall 70 may be a stop wall.

Referring to FIGS. 1-3, the first housing 44 and the second housing 50 define a cavity 90 that is disposed between the first housing first end portion 46 and the second housing first end portion 52. The differential unit 36 is disposed within the cavity 90. The first housing 44 may be connected to the second housing 50 through the differential unit 36 or an outer housing.

The output shaft 24 extends at least partially through the first housing 44, the second housing 50, and the differential unit 36 along the first axis 40. The output shaft 24 is rotatably supported by bearings that are disposed within the first housing 44, the second housing 50, and the differential unit 36.

The first carrier or first shaft 32 is disposed about a first portion of the output shaft 24. The first shaft 32 extends between and is at least partially received within the differential unit 36 and the first housing 44. The first shaft 32 is arranged to translate along the first axis 40 relative to the first portion of the output shaft 24.

The first shaft 32 extends between a first shaft first end 100 and a first shaft second end 102. The first shaft first end 100 is connected to the differential unit 36. The first shaft second end 102 is connected to the torque limiter 38. The first shaft second end 102 defines or includes a shaft flange 104 that engages a portion of the torque limiter 38.

The first shaft 32 is drivably connected to the output shaft 24 through a spline or ball spline provided by a splined portion 106 that is disposed between the first shaft first end 100 and the first shaft second end 102.

In the embodiment shown in FIGS. 2 and 3, a second shaft 33 is disposed about a second portion of the output shaft 24 and may extend between and may be at least partially received within differential unit 36 and the second housing 50. The second shaft 33 may have a substantially similar configuration as the first shaft 32 and may be arranged to translate along the first axis 40 relative to the second portion of the output shaft 24.

The first input member 34 may be a rotary input member that extends between portions of the first housing 44 and the differential unit 36. The first input member 34 may be drivably connected to the first shaft 32 through a splined connection 110. The first input member 34 is drivably connected to the first power input 20 through a spur gear or the like. The first input member 34 transmits a torque that is applied by the first power input 20 to the first shaft 32, to the differential unit 36, and to the output shaft 24. The first shaft 32 may move relative to the output shaft 24 along the first axis 40, responsive to a load input through the first input member 34.

The second input member 35 may be a rotary input member that extends between portions of the second housing 50 and the differential unit 36. The second input member 35 may be drivably connected to the second shaft 33. The second input member 35 is drivably connected to the second power input 22 through a spur gear or the like. The second input member 35 transmits a torque that is applied by the second power input 22 to the second shaft 33, to the differential unit 36, and to the output shaft 24, separately or independently from the input provided by the first input member 34. The second shaft 33 may move relative to the output shaft 24 along the first axis 40, responsive to a load input through the second input member 35.

The differential unit 36 is disposed within the cavity 90 that is defined between the first housing 44 and the second housing 50. The differential unit 36 is operatively connected to at least one of the output shaft 24, the first shaft 32, and/or the second shaft.

The differential unit 36 includes differential gears 114 that are operatively connected to the first shaft 32 and/or the second shaft. The differential gears 114 may be bevel gears having a lash, mesh, or contact pattern that may be varied or adjusted by loading applied by the first input member 34 and/or the torque limiter 38. The differential gears 114 rotate around an axis 92.

The torque limiter 38 is disposed within the first housing 44, as shown in FIG. 1. A first torque limiter is disposed within the first housing 44 and a second torque limiter is disposed within the second housing 50, as shown in FIGS. 2 and 3.

The torque limiter(s) 38 is disposed about the output shaft 24 and a portion of the first shaft 32 and/or the second shaft. For brevity, the torque limiter 38 disposed within the first housing 44 will be described, however, the torque limiter disposed within the second housing 50 may have a substantially similar configuration as the torque limiter 38 disposed within the first housing 44.

The torque limiter 38 may be operatively connected to the first shaft 32 and may be spaced apart from the output shaft 24. The torque limiter 38 is arranged to selectively inhibit rotation of at least one of the output shaft 24 and/or the first shaft 32 through the selective engagement with the first housing 44, in the embodiment shown in FIG. 1, or through selective engagement with at least one of the first housing 44 and/or the second housing 50, in the embodiment shown in FIGS. 2 and 3.

The torque limiter 38 includes a brake member 120, a biasing member 122, and a bearing member 124.

The brake member 120 is disposed about the first shaft second end 102 and is disposed proximate the shaft flange 104 of the first shaft 32. The brake member 120 may be operatively connected to the first shaft 32. The brake member 120 is disposed within the brake bore 60 and is arranged to selectively engage the stop wall 70.

The brake member 120 includes a plurality of brake plates having biasing members disposed between adjacent brake plates. The plurality of brake plates may be connected to the first shaft 32 through a splined connection.

The biasing member 122 is disposed within the biasing member bore 62. The biasing member 122 extends between and is operatively connected to the shaft flange 104 through the bearing member 124 and the end wall 72. The biasing member 122 is arranged to bias the brake member 120 away from engagement with the stop wall 70. The biasing member 122 may be arranged to adjust a lash, mesh, or contact pattern between differential gears of the differential unit 36.

The bearing member 124 is disposed between the brake member 120 and the biasing member 122. The bearing member 124 is operatively connected to the shaft flange 104 and an end of the biasing member 122. The bearing member 124 may be a thrust bearing or the like.

The torque limiter 38 is actuated responsive to a load applied to the first shaft 32 by the first input member 34 greater than a threshold load or torque load, which may lead to the separation of the differential gears of the differential unit and overcome the biasing force applied by the biasing member 122. The first shaft 32 translates relative to the output shaft 24 and/or the first axis 40, compressing the biasing member 122, and moving the brake member 120 towards engagement with the stop wall 70 of the first housing 44 and/or the second housing 50 to apply a braking effect to reduce a rotational speed and/or inhibit rotation of the output shaft 24, as shown in the top half of FIG. 3.

The inhibiting of rotation of the output shaft 24 inhibits the power driving unit 10 from providing a mechanical output to inhibit affected components downstream of the power drive unit 10.

Figure 5:
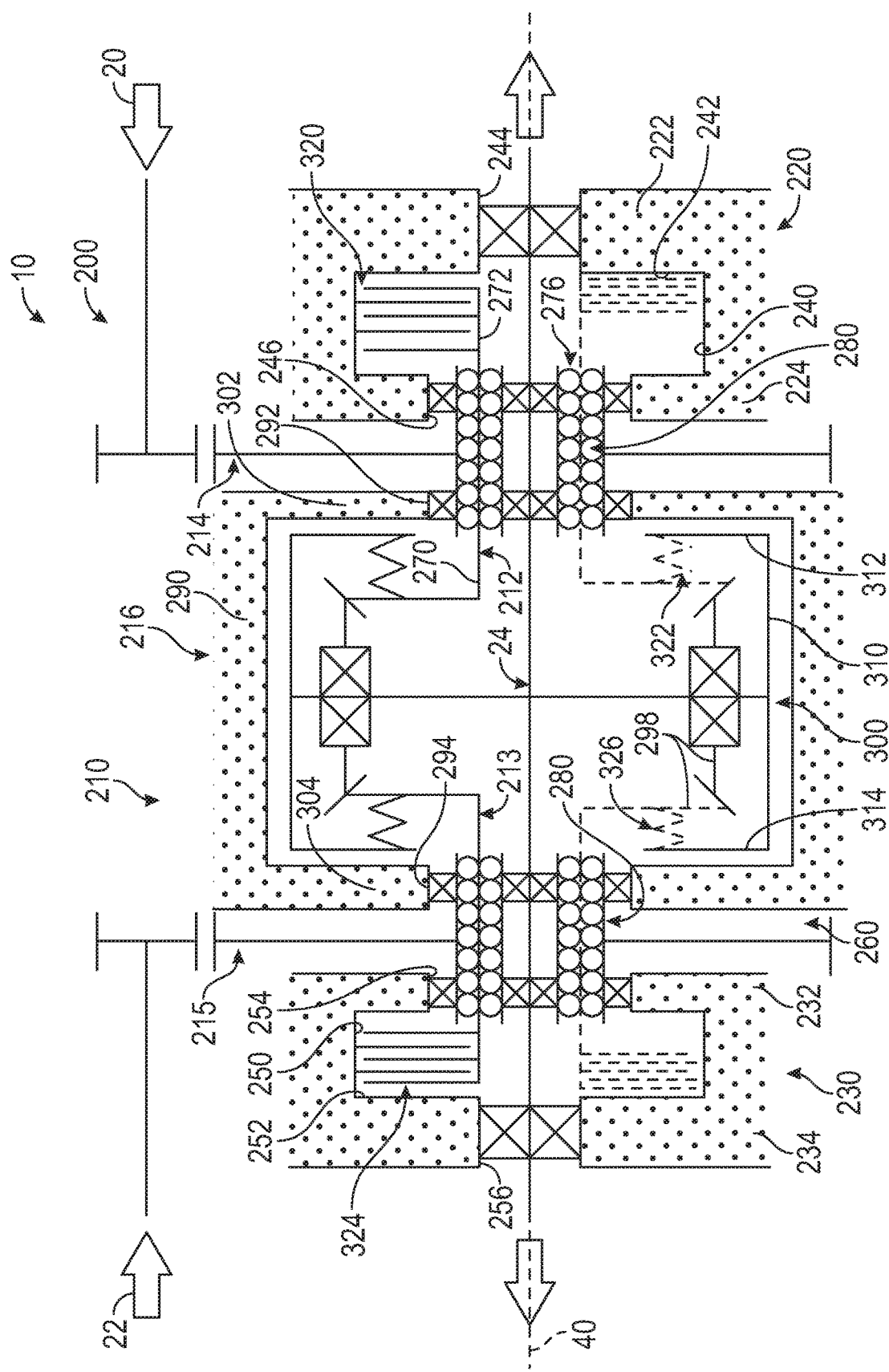
FIG. 5 is a schematic illustration of a split view of the third embodiment of the differential assembly in a second position.

Referring to FIGS. 4 and 5, a differential assembly 200 is shown. The differential assembly 200 includes the output shaft 24, a housing assembly 210, a first shaft 212, a first input member 214, a second input member 215, a differential unit 216, and a torque limiter 218. The differential assembly 200 may be arranged to include a dual brake or dual torque limiter.

The housing assembly 210 is disposed about the first axis 40. The housing assembly 210 includes a first housing 220 that extends between a first housing first end portion 222 and a first housing second end portion 224 along the first axis 40. The housing assembly 210 further includes a second housing 230 that extends between a second housing first end portion 232 and a second housing second end portion 234 along the first axis 40.

The first housing 220 defines a brake bore 240, a stop wall 242, a first bearing bore 244, and a second bearing bore 246. The brake bore 240 extends between the first housing first end portion 222 and the first housing second end portion 224. The stop wall 242 is disposed proximate the first housing second end portion 224 and the brake bore 240 terminates at the stop wall 242.

The first bearing bore 244 may be defined by the first housing first end portion 222. The first bearing bore 244 is arranged such that the brake bore 240 is disposed between the first bearing bore 244 and the second bearing bore 246. The first bearing bore 244 may have a first bearing bore diameter.

The second bearing bore 246 may be defined by the first housing second end portion 224. The second bearing bore 246 may have a second bearing bore diameter that is less than the first bearing bore diameter.

The second housing 230 is spaced apart from the first housing 220. The second housing 230 defines a brake bore 250, a stop wall 252, a first bearing bore 254, and a second bearing bore 256. The brake bore 250 extends between the second housing first end portion 232 and the second housing second end portion 234. The stop wall 252 is disposed proximate the second housing second end portion 234 and the brake bore 250 terminates at the stop wall 252.

The first bearing bore 254 may be defined by the second housing first end portion 232. The first bearing bore 254 is arranged such that the brake bore 250 is disposed between the first bearing bore 254 and the second bearing bore 256. The first bearing bore 254 may have a first bearing bore diameter.

The second bearing bore 256 may be defined by the second housing second end portion 234. The second bearing bore 256 may have a second bearing bore diameter that is less than the first bearing bore diameter.

The differential unit 216 is disposed within a cavity 260 that is disposed between the first housing first end portion 222 and the second housing first end portion 232. The first housing 220 may be connected to the second housing 230 through the differential unit 216.

The output shaft 24 extends at least partially through the first housing 220, the second housing 230, and the differential unit 216 along the first axis 40.

The first shaft 212 is disposed about a first portion of the output shaft 24. The first shaft 212 extends between and is at least partially received within the differential unit 216 and the first housing 220. The first shaft 212 is arranged to translate along the first axis 40 relative to the first portion of the output shaft 24.

The first shaft 212 extends between a first shaft first end 270 and a first shaft second end 272. The first shaft first end 270 is connected to the differential unit 216. The first shaft second end 272 is connected to the torque limiter 218.

The first shaft 212 is drivably connected to the output shaft 24 through a spline or ball spline provided by a splined portion 276 that is disposed between the first shaft first end 270 and the first shaft second end 272.

A second shaft 213 is disposed about a second portion of the output shaft 24 and may extend between and may be at least partially received within differential unit 216 and the second housing 230. The second shaft 213 may have a substantially similar configuration as the first shaft 212 and may be arranged to translate along the first axis 40 relative to the second portion of the output shaft 24. The second shaft 213 may be drivably connected to the output shaft 24 through a spline or ball spline provided by a splined portion 282 that is disposed between a second shaft first end and a second shaft second end.

The first input member 214 may be a rotary input member that extends between portions of the first housing 220 and the differential unit 216. The first input member 214 may be drivably connected to the first shaft 212 through a splined connection 280. The first input member 214 is drivably connected to the first power input 20 through a spur gear or the like. The first input member 214 transmits a torque that is applied by the first power input 20 to the first shaft 212, to the differential unit 216, and to the output shaft 24. The first shaft 212 may move relative to the output shaft 24 along the first axis 40, responsive to a load input through the first input member 214.

The second input member 215 may be a rotary input member that extends between portions of the second housing 230 and the differential unit 216. The second input member 215 may be drivably connected to the second shaft 213 through a splined connection 280. The second input member 215 is drivably connected to the second power input 22 through a spur gear or the like. The second input member 215 transmits a torque that is applied by the second power input 22 to the second shaft 213, to the differential unit 216, and to the output shaft 24 separately or independently from the input provided by the first input member 214. The second shaft 213 may move relative to the output shaft 24 along the first axis 40, responsive to a load input through the second input member 215.

The differential unit 216 is disposed within the cavity 260 that is defined between the first housing 220 and the second housing 230. The differential unit 216 is operatively connected to at least one of the output shaft 24, the first shaft 212, and/or the second shaft 213. The differential unit may be configured as an open differential, a locking differential, a limited slip differential, etc.

The differential unit 216 includes a differential housing 290, a first bearing bore 292, a second bearing bore 294, a carrier 296, and differential gears 298.

The differential housing 290 defines a differential cavity 300 that extends between a differential housing first end 302 and a differential housing second end 304. The first shaft first end 270 and the second shaft first end extend into the differential cavity 300.

The first bearing bore 292 is defined by the differential housing first end 302. The second bearing bore 294 is defined by the differential housing second end 304.

The carrier 296 is disposed within the differential cavity 300. The carrier 296 includes a carrier body 310 having a first carrier arm 312 extending from a first end of the carrier body 310 and a second carrier arm 314 extending from a second end of the carrier body 310. The first carrier arm 312 and the second carrier arm 314 each extend towards the first axis 40 and the output shaft 24.

The differential gears 298 are disposed within the differential cavity 300. The differential gears 298 are operatively connected to the first shaft 212 and the second shaft 213. The differential gears 298 may be bevel gears having a lash, mesh, or contact pattern that may be varied or adjusted by loading applied by the first input member 214 and/or the torque limiter 218.

The torque limiter 218 is arranged to selectively inhibit rotation of at least one of the output shaft 24, the first shaft 212, and/or the second shaft 213 through selective engagement with at least one of the first housing 220 and/or the second housing 230. The torque limiter 218 includes a first brake member 320, a first biasing member 322, a second brake member 324, and a second biasing member 326.

The first brake member 320 is disposed about the first shaft second end 272. The first brake member 320 may be operatively connected to the first shaft 212. The first brake member 320 is disposed within the brake bore 240 and is arranged to selectively engage the stop wall 242.

The first brake member 320 includes a plurality of brake plates having biasing members disposed between adjacent brake plates. The plurality of brake plates may be connected to the first shaft 212 through a splined connection.

The first biasing member 322 is disposed within the differential cavity 300 of the differential housing 290. The first biasing member 322 extends between and is operatively connected to the first carrier arm 312 and at least one of the differential gears 298 and/or the first shaft 212. The first biasing member 322 is arranged to bias the first brake member 320 away from engagement with the stop wall 242. The first biasing member 322 may be arranged to adjust a lash, mesh, or contact pattern between differential gears 298. The first biasing member 322 may include coil springs or a stack of Belleville springs that have a center on a differential gear centerline.

The second brake member 324 is disposed about the second shaft second end of the second shaft 213. The second brake member 324 may be operatively connected to the second shaft 213. The second brake member 324 is disposed within the brake bore 250 and is arranged to selectively engage the stop wall 252.

The second brake member 324 includes a plurality of brake plates having biasing members disposed between adjacent brake plates. The plurality of brake plates may be connected to the second shaft 213 through a splined connection.

The second biasing member 326 is disposed within the differential cavity 300. The second biasing member 326 extends between and is operatively connected to the second carrier arm 314 and at least one of the differential gears 298 and/or the second shaft 213. The second biasing member 326 is arranged to bias the second brake member 324 away from engagement with the stop wall 252. The second biasing member 326 may be arranged to adjust a lash, mesh, or contact pattern between differential gears 298. The second biasing member 326 may include coil springs or a stack of Belleville springs that have a center on a differential gear centerline.

The torque limiter 218 is actuated responsive to a load applied to at least one of the first shaft 212 and/or the second shaft 213 by an input member greater than a threshold load or torque load may lead to the differential gears 298 of the differential unit 216 to separate and overcome the biasing force applied by the biasing members 322, 326. The first shaft 212 and/or the second shaft 213 translates relative to the output shaft 24 and/or the first axis 40, compressing the first biasing member 322 and moving the first brake member 320 towards engagement with the stop wall 242 of the first housing 220, compressing the second biasing member 326 and moving the second brake member 324 towards engagement with the stop wall 252 of the second housing 230 to apply a braking effect to reduce a rotational speed and/or inhibit rotation of the output shaft 24, as shown in the bottom half of FIG. 5.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A differential assembly, comprising:
   a housing assembly disposed about a first axis, the housing assembly having a first housing and a second housing, the first housing and the second housing defining a cavity therebetween;
   an output shaft that extends at least partially through at least one of the first housing and the second housing along the first axis;
   a shaft disposed about and arranged to translate along the first axis relative to the output shaft;
   a differential unit disposed within the cavity and connected to at least one of the output shaft and the shaft; and
   a torque limiter disposed about the output shaft and a portion of the shaft, the torque limiter being arranged to selectively engage a stop wall of at least one of the first housing and the second housing to inhibit rotation of the output shaft about the first axis;

wherein the shaft extends between a shaft first end that is connected to the differential unit and a shaft second end that is connected to the torque limiter;

a brake member that is disposed about the shaft second end and disposed within a brake bore defined by at least one of the first housing and the second housing;

a biasing member that is operatively connected to at least one of the first housing and the second housing and extends towards the brake member; and a bearing member disposed between the brake member and the biasing member.

2. The differential assembly of claim 1, wherein the differential unit includes a carrier that is disposed within a differential housing that is connected to the first housing and the second housing.

3. The differential assembly of claim 1, wherein the shaft second end engages the bearing member.

4. The differential assembly of claim 1, wherein the brake member is disposed within the brake bore and is arranged to selectively engage the stop wall.

5. The differential assembly of claim 4, wherein at least one of the first housing and the second housing defines a biasing member bore that extends from the stop wall towards an end wall.

6. The differential assembly of claim 5, wherein the biasing member is disposed within the biasing member bore and extends between and engages the end wall and the bearing member.

7. The differential assembly of claim 5, wherein the biasing member is arranged to bias the brake member away from engagement with the stop wall.

8. The differential assembly of claim 7, further comprising:

an input member that is drivably connected to the shaft through a splined connection defined between the input member and the shaft.

9. The differential assembly of claim 8, wherein responsive to a load input through the input member to the shaft greater than a threshold, the shaft moves relative to the first axis such that the brake member moves towards engagement with the stop wall to reduce a rotational speed of the output shaft.

* * * * *